Dec. 27, 1966 M. J. RELIS 3,295,104

INDICIA REGISTRATION RESPONSIVE CHARACTER RECOGNITION SYSTEM

Filed May 11, 1964 2 Sheets-Sheet 1

INVENTOR.
MATTHEW J. RELIS

BY

Vincent L. Carney

ATTORNEY

Dec. 27, 1966 M. J. RELIS 3,295,104

INDICIA REGISTRATION RESPONSIVE CHARACTER RECOGNITION SYSTEM

Filed May 11, 1964 2 Sheets-Sheet 2

INVENTOR.
MATTHEW J. RELIS

BY

Vincent L. Carney

ATTORNEY

United States Patent Office 3,295,104

Patented Dec. 27, 1966

3,295,104

INDICIA REGISTRATION RESPONSIVE CHARACTER RECOGNITION SYSTEM

Matthew J. Relis, Fair Lawn, N.J., assignor to Burroughs Corporation, Detroit, Mich., a corporation of Michigan Filed May 11, 1964, Ser. No. 366,352
9 Claims. (Cl. 340—146.3)

This invention relates to a system fo recognizing characters, and more particularly, to a system for scanning characters so as to derive electrical signals which automatically identify the scanned character.

To derive the signals representing a character, it is frequently desirable to scan the character in two directions: a horizontal direction and a vertical direction. Scanning motion may be achieved for example, by generation of a light beam which is deflected in a vertical direction relative to the character to be scanned. Horizontal motion may be achieved by movement of the document past the scanning means. In such a system, rigid requirements for constant velocity are necessary with regard to vertical as well as horizontal scanning motion.

In systems using the aforementioned scanning techniques, a flying spot scanner is customarily used. In addition to the disadvantages mentioned above, these systems exhibit a further disadvantage in that the document being scanned must be kept in almost complete darkness so that the light incident on a pickup tube is primarily from the flying spot. In systems of this type the aforementioned requirements result in the necessity for an increase in the cost and complexity of components. Such systems contain inherent weaknesses affecting reliability and accuracy in identifying characters. Accordingly, it is an object of the present invention to provide a character recognition system which is reliable, accurate, and which obviates the disadvantages mentioned above.

It is a further object of the present invention to provide an improved character recognition system which operates reliably and accurately even though there are wide variations in document velocity during scanning.

A further object of the present invention is to provide an improved character recognition system which operates successfully without requiring that the document to be read be placed in a light-tight housing or be otherwise shielded from stray or incident light.

It is a still further object of the invention to provide a scanning system for a character recognition system in which signals are derived from the character at a controlled registration time so as to provide tolerance to variations in vertical registration, to horizontal registration, and to the scanning waveform.

In accordance with the above objects a sensing means, such as an array of multiplier phototubes, is provided to sense variations in shadings of images projected thereon. An electronic scanning means, such as an image converter tube, scans a document or other recording media containing the characters to be recognized. The scanning means projects an image of each character scanned onto the sensing means. Horizontal motion of the character image relative to the sensing means is created by the motion of the document past the scanning means. The scanning means include deflection means which produce vertical motion of the image relative to the sensing means.

As has been stated, the sensing means may comprise an array of photo sensitive devices. One group of said photosensitive devices is designated for the purpose of indicating the vertical position of the image projected. A second group of said photosensitive devices is designated for the purpose of indicating the horizontal position of the image. In operation the sensing means generates signals that are representative of light and dark areas of the character image projected thereon. These signals are transmitted through appropriate gating means to identifying means which recognize the pattern of signals received as representative of a particular character. The signals generated by the sensing means are inhibited from passing to the identifying means until the image projected on the sensing means is in a desired position relative to said sensing means. When the character image is in position to be recognized, i.e., when the character is in registration, signals which are generated by the sensing means and which indicate the vertical and horizontal position of the character image actuate the gating means to transmit the pattern of signals representative of the character to be recognized to the identifying means.

Therefore, only when a character image is in the appropriate position relative to the sensing means, that is, when it is in registration, are the signals generated by the sensing means transmitted to the identifying means. In this manner each character has a pattern of signals unique for that character thereby enabling identification of the character in the identifying means.

The invention and the above-noted and other features thereof will be understood more clearly and fully from the following detailed description when considered with reference to the accompanying drawings in which.

Figure 1:
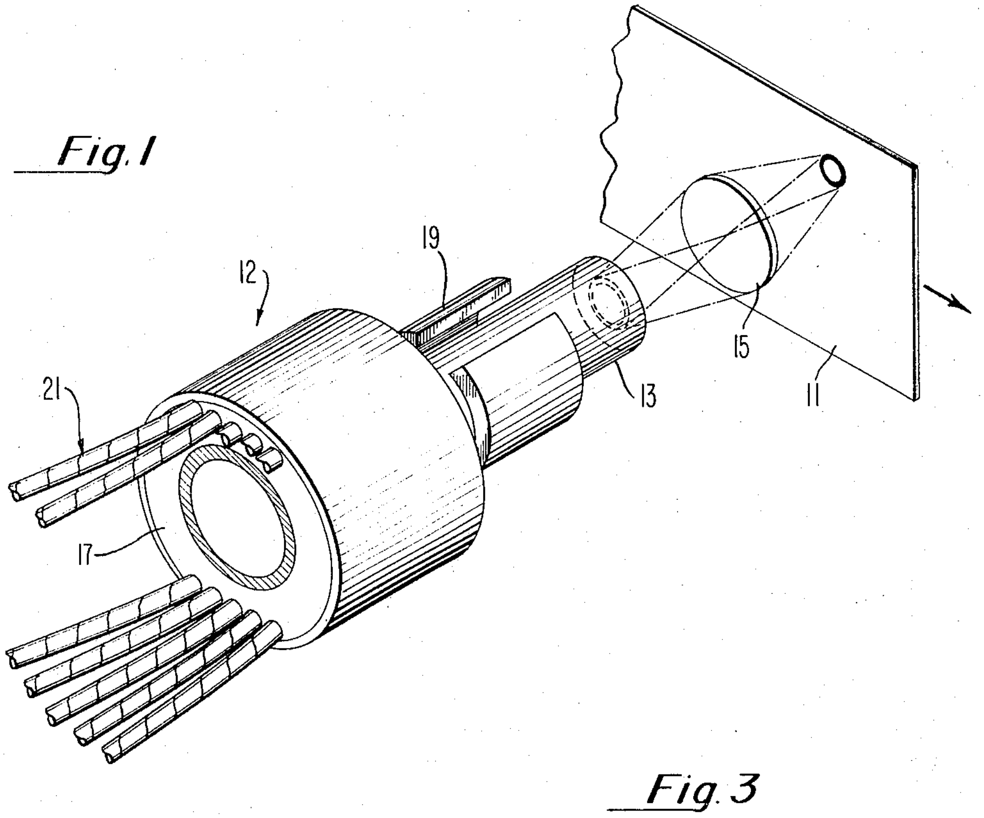
FIGURE 1 is a simplified perspective view of optical scanning means in the form of an image converter tube, which is adaptable for use with the present invention.

In FIGURE 1, a document 11 containing the characters to be recognized is driven past an image converter tube 12 in the direction indicated by the arrow. For purposes of the present description, operation of the present invention to recognize the alphabetic character "O" contained upon the document 11 is set forth. It is to be understood, however, that the present invention may be utilized to read numeric and other types of characters, as well as alphabetic characters.

The scanning means shown for purposes of the present description is an image converter tube. Image converter tubes are used for converting an infrared image into a visible image. They are also used for conversion of visible radiation of one wavelength into visible radiation of another wavelength. The image converter tube 12 contains a photo-cathode 13 onto which the image to be converted is projected through lens 15, and at which a distribution of photo-electrons is generated in accordance with the distribution of incident light on the photo-cathode. These electrons are accelerated to a phosphor screen 17 by means of an accelerating voltage in the tube, and electron-optical means are used to form an electron image at the screen 17. The electron image formed at the phosphor screen 17 is a distribution of electrons generated at the photo-cathode 13. Magnetic focusing is used to obtain a sharp image. Neither the focusing coil, nor the electron-optical elements within the tube are shown in FIGURE 1.

When the electrons focused on the screen 17 impinge thereon, they cause a visible image to appear on the screen. This image is usually magnified compared to the image projected on the photo-cathode 13, and the total light flux emitted by this image is greater than the incident light flux on the photo-cathode. This is due to the energy imparted to the electrons by an accelerating field.

Image converter tubes of the type shown in FIGURE 1 are made by Mullard Company, Ltd., of England. In particular, a tube made by RCA is described in RCA Review, volume XVIII, September 1957, No. 33, pp. 322–331. This tube utilizes electrostatic deflection. In the present application a phosphor with fast decay time is used, such as the P15 or P16 phosphor. The phosphor should be applied in a manner that results in the high resolution inherent in the electron optics of the tube.

Image converter tubes may be equipped with magnetic deflection coils to cause the image projected on the phosphor screen to be deflected or displaced as desired. In FIGURE 1, the image converter tube is equipped with deflection coils 19 which are so placed that current through them causes deflection of the final image in a vertical direction. In FIGURE 1, the letter "O" is projected from the document 11 onto the photo-cathode 13. Through the mechanism of the image converter tube it appears as a visual image on the phosphor screen 17. The electron image developed by the photo-cathode 13, which results from the distribution of light incident thereon, may be deflected by the deflection coils 19. By supplying a periodic deflection current to the coils 19, the image on the phosphor screen 17 may be caused to deflect in a periodic way in the vertical direction. If the document 11 is moving at right angles to the direction of deflection, a scanning motion is generated which causes the image to scan vertically and horizontally past any point in the phosphor screen 17. It will be clear that this is equivalent to a raster scan generated by the point over the image.

The phosphor screen 17 has connected thereto a plurality of photoelectric sensors, placed at each of a multiplicity of points on the screen in a matrix array. For purposes of this description the photoelectric sensors are shown as Lucite rods 21 in FIGURE 1. The Lucite rods have a diameter which is a substantial fraction of the center-to-center spacing of the sensor matrix elements. Both ends of the rod are cut off square and polished. One end is placed squarely against the face of the screen 17, as shown in FIGURE 1, which shows several sensors in position. The other end of the rod is placed squarely against the bulb of a multiplier phototube. Such a multiplier phototube is shown in FIGURE 3, with the Lucite rod attached thereto.

Figure 2:
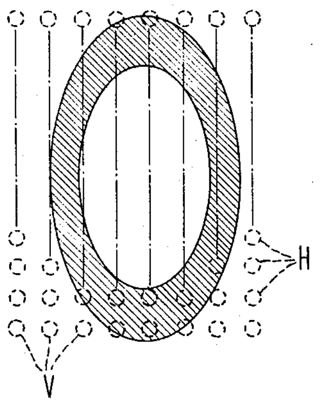
FIGURE 2 is a diagrammatic representation of a character image superimposed upon an array of photosensitive devices upon which the character image is projected by the image converter tube.

FIGURE 2 shows one manner in which the Lucite rod sensors may be arranged on the phosphor screen 17. In the arrangeemnt shown in FIGURE 2, a row of sensors is used to determine when the character, as it is being swept across the sensors vertically by the scanning action of the image converter tube, is in vertical registrtaion with respect to the matrix sensors. This is the row designated as V sensors. A column of sensors designated H sensors is used to determine when the character, as it progresses horizontally due to document motion, is in horizontal registration with respect to the matrix of the sensors. A group designated R sensors (not labeled) which may or may not include the V sensors, as will be hereinafter explained, comprises the sensors used for recognition once a character is registered.

Figure 3:
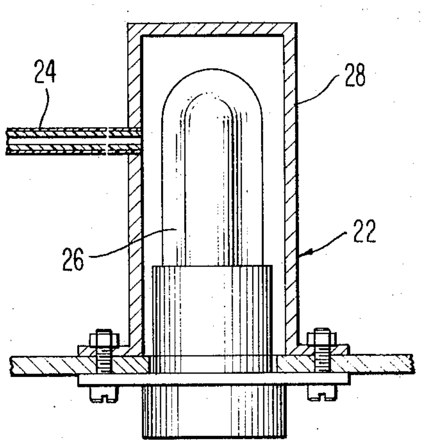
FIGURE 3 is a sectional view of a multiplier phototube associated with one of the sensing means.

In FIGURE 3 a sectional view of a photomultiplier assembly 22 and a Lucite rod 24 is shown. The Lucite rod 24 is placed in such a position that the sensitivity of a phototube 26 to light flux emitted by the rod end is at a maximum. The rod is wrapped with an opaque tape as shown in FIGURES 1 and 3, to prevent the entry of stray light through its cylindrical walls. The photocell is placed in a light-tight housing 28 having an aperture into which the wrapped rod fits snugly, to prevent the incidence of stray light on the phototube. If precautions are taken to provide a high polish on the walls of the rods, and if they are not bent too sharply, they act as very efficient conductors of light flux. By causing the rods to diverge into two dimensions as they are brought away from the face of the image converter tube, and by cutting the rods to different lengths, it is possible to convey light flux efficiently to a three-dimensional array of multiplier phototubes, if such an arrangement is desired.

The multiplier phototube shown in FIGURE 3 operates to develop a signal which is representative of the portion of the image incident upon the end of the Lucite rod sensor opposite the end to which the phototube is attached. Thus, the pattern of signals generated by each of a multiplicity of multiplier phototubes, each connected to a Lucite rod sensor, may be utilized to identify the character image projected upon the phosphor screen 17. A block diagram of the system utilized in the present invention for transmission and recognition of the signal pattern is depicted in FIGURE 4.

Figure 4:
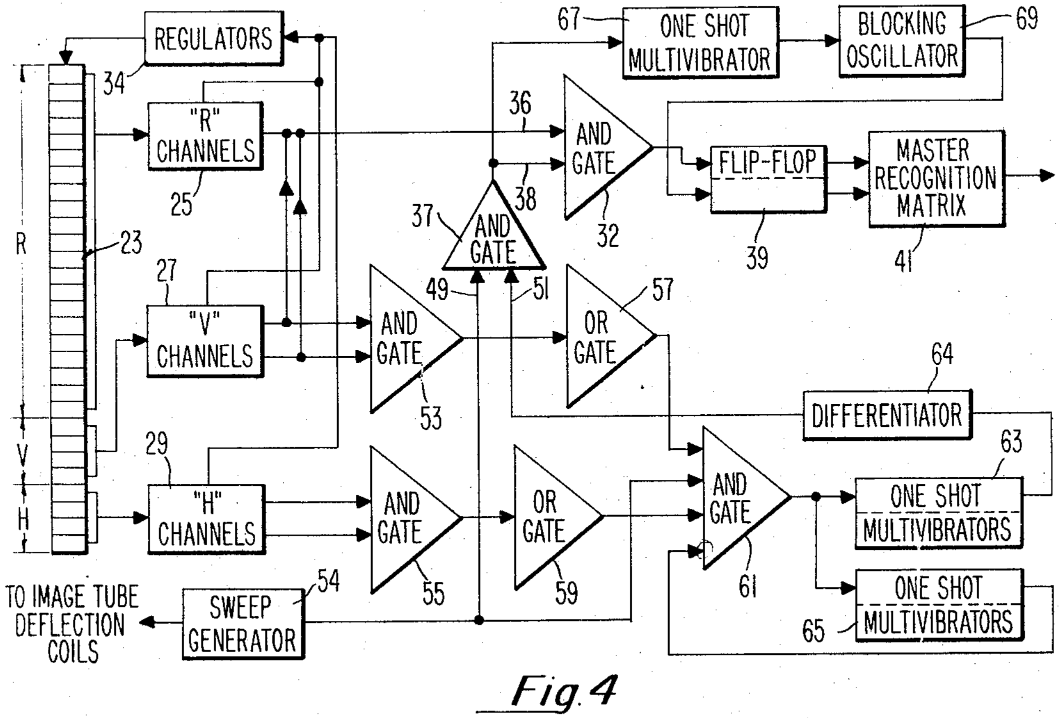
FIGURE 4 is a block diagram of the system.

In FIGURE 4, a group of phototubes, designated generally by the number 23, is shown. Each of the phototubes is the same as that shown in FIGURE 3. The spatial relationship of the phototubes shown in FIGURE 4 is not necessarily consistent with successful operation of the system, and is for description purposes only. Within the grouping of phototubes 23 shown in FIGURE 4, there are three sub-groups labelled R, V, and H. The labelling of these sub-groups is intended to be consistent with the labelling of FIGURE 2.

Figure 5:
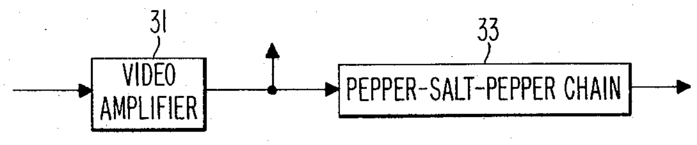
FIGURE 5 is a block diagram showing a more detailed breakdown of a portion of the system illustrated in FIGURE 4.

The output signal of each phototube is connected to a signal channel, the R sensors being connected to R channels 25, the V sensors being connected to V channels 27, and the H sensors being connected to H channels 29. A more detailed view of the signal channels is shown in FIGURE 5.

Each channel contains a video amplifier 31, and a short-pulse filter 33, or "pepper-salt-pepper" chain. The amplifier 31 raises the level of the photocell output signals and feeds the amplified signals to the filter 33. The purpose of the filter is to remove all short black pulses ("pepper") or short gaps in long black pulses ("salt"). The pulses removed are of a duration less than the duration of a pulse generated by scanning vertically across a horizontal bar equal in width to the minimum character line width. The output of the filter is a two-valued signal with fast rise and fall times, having the pulses caused by "salt" and "pepper" filtered out. The principle of the "pepper" and "salt" circuits is described in Patent No. 2,947,945. An amplifier of the type that may be used here is described in Patent No. 2,862,046. The signals, after amplification, are also directed from the video amplifier 31 to the regulators 34, as shown in FIGURE 4.

The regulators 34 are supplied because multiplier phototubes show tremendous variation in sensitivity for a prescribed set of operating conditions. In practical systems it is desirable to provide automatic regulation of sensitivity, so that the sensitivity of different phototubes at different times, may be held within fairly narrow limits. Fortunately, the sensitivity of multiplier phototubes is a function of dynode voltage, and it is possible to regulate the sensitivity automatically by controlling the dynode voltage in response to some amplitude characteristic of the signal. It has been found best to use the peak-to-peak video signal as the amplitude regulation characteristic, i.e., the signal swing from full black to full white. A regulating circuit, which derives its input from the video amplifier output, and which applies correcting voltage to the dynodes of the multiplier phototubes, is described in Patent No. 2,894,247.

It is possible to use a signal regulator common to all channels, by time-sharing the regulator among all channels, since change in sensitivity with time is slow and therefore the regulation of sensitivity may involve a very narrow band width. Thus, successive channels may be regulated in successive scans. At a scanning rate of 1800 scans per second in a 90 channel system, each channel is regulated twenty times per second. A sequential sampling circuit and a controlling counter may be added to accomplish this, but this eliminates about 90 regulating channel circuits, or about 180 vacuum tubes, resulting in a substantial saving.

After regulation, amplification, and filtering, the signals proceed through the remainder of the system as illustrated in FIGURE 4. In FIGURE 4, it is intended that there be one R channel 25 for each phototube in the group labeleld R. The same is true of the phototubes labelled V and H. The R channels process the signals to be used in actual recognition once registration has occurred. For each R channel 25 there is an AND gate 32 to which the processed signals from the R channels are applied. AND gate 32 is shown with two inputs 36 and 38. Input 36 is directly from the R channel. Input 38 is derived from the output of AND gate 37. AND gate 37 applies an enabling pulse to AND gate 32 through input 38 at registration thereby allowing the signals from R channels 25 to pass through AND gate 32. The method and apparatus for establishing registration will be subsequently described.

From the foregoing it is apparent that AND gates 32 pass the signals received from R channels 25 only when a character to be recognized is in a particular predetermined position with relation to the phosphor screen 17 of the image converter tube shown in FIGURE 1. This condition, called "registration" results in the existence of a unique pattern of light signals transmitted by the Lucite rods 21 to the multiplier phototubes 23. Each AND gate 32, at registration time, passes a signal which is representative of the light signal transmitted to its respective phototube 23. The AND gates 32 pass a signal which indicates the state of a particular photocell. Each AND gate 32 is electrically connected to a different flip-flop 39. Depending upon the nature of this signal, the AND gate 32 either causes its respective flip-flop to switch to the set condition or allows it to remain in the reset condition. At registration time, all the AND gates 32 pass the signals that either set their respective flip-flops 39, or allow the flip-flops 39 to remain in the reset condition. The pattern established by the flip-flops 39 is representative of the character scanned. Therefore, for each character to be recognized, a pattern is established by the states of the flip-flops 39, which pattern is unique for a particular character. The master recognition matrix 41 operates to recognize the pattern established by the flip-flops 39, and to transmit a character output signal which indicates which of the characters is represented by the condition of the flip-flops 39. The master recognition matrix 41 is shown in greater detail in FIGURE 6. The manner in which recognition of a character is accomplished in this portion of the system will now be described.

As shown in FIGURE 2, the character image projected on the phosphor screen 17 of the image converter tube depicted in FIGURE 1 occupies a unique position relative to the Lucite rod sensors 21. Therefore, at recognition time, for each sensor one of three conditions may exist. These conditions are as follows:

(1) The sensor overlies a portion of the character and a signal (black video) is transmitted through the R channels and through AND gate 32 to flip-flop 39 associated with that sensor.

(2) The sensor overlies a portion where a part of the character does not exist, and a signal (white video) is transmitted to the R channel 25 and through AND gate 32 to the flip-flop 39 associated with the sensor.

(3) It is uncertain whether the sensor overlies a portion of the image wherein a part of the character exists. This condition would be true for a sensor positioned along the outline of the character image.

If the first of the above-mentioned three conditions exist: that is, if for a particular character, it is known with certainty that a particular sensor will overlie a portion of the character, then the AND gate 32 associated with that sensor transmits a signal to its associated flip-flop 39 which places the flip-flop in the set condition. If the second of the aforementioned three conditions exists, that is, if for a particular character it is known with certainty that a particular sensor overlies a portion of the image wherein no part of the character exists then the AND gate 32 associated with that sensor transmits a signal to its respective flip-flop 39 which does not cause the flip-flop to switch to the set condition, and the flip-flop remains in the reset condition.

The master recognition matrix 41 is comprised of a series of AND gates, there being one AND gate for each character to be recognized. Therefore, if there are *n* numbers of characters to be recognized, there are *n* numbers of AND gates in the character recognition matrix.

In the circuit of FIGURE 4, AND gate 37 is shown as having two inputs 49 and 51. Input 49 is derived from the sweep generator 54 which develops the sweep voltage for the deflection coils 19 shown in FIGURE 1. At the beginning of each scan an unblanking pulse is derived from the sweep generator 54. This unblanking pulse is applied to gate 37 as an enabling pulse by way of input 49. Gate 32 does not pass video signals until it receives an enabling pulse from gate 37 by way of input 38. The enabling pulse on input 38 does not exist unless gate 37 is enabled. Gate 37 is enabled during scan and disabled during retrace by input 49 which is derived from the unblanking pulse. This type of connection is made because some types of image converter tubes have no convenient means for blanking during retrace. They therefore generate an output during retrace as well as during the normal useful scan. In this case, some means of blanking elsewhere in the system is necessary.

We will now proceed with the description of the manner in which registration time is established. The time at which the character is in registration is established by the sensors labeled V and H. As has been stated, there is a V channel 27 associated with each V sensor. There is also an H channel 29 associated with each H sensor. The outputs of the V and H channels are applied to AND gates 53 and 55 respectively. There is one AND gate 53 for each two adjacent V channels. There is one AND gate 55 for each two adjacent H channels. The H channels and the V channels are identical in design with those used for the R channels. In fact, as will be explained at a later time, the V sensors are sometimes used as R sensors depending upon which of two alternative methods of establishing registration is intended.

The outputs of AND gates 53 are applied to an OR gate 57. The outputs of AND gates 55 are applied to an OR gate 59. The outputs from OR gates 57 and 59 are applied to an AND gate 61. The unblanking pulse in the sweep generator (which generates the sweep waveform applied to the deflection coils 19 of the image converter tube shown in FIGURE 1) is also applied to the input of AND gate 61.

The first time that at least two adjacent V sensors enter the black portion of a character in coincidence with the existence of black at two adjacent H sensors and in further coincidence with the unblanking pulse from the sweep generator three of the four inputs to AND gate 61 are enabling pulses. Assuming for the present that the fourth input is also an enabling input, AND gate 61 is enabled and generates an output pulse. This output pulse triggers the one shot multivibrators 63 and 65. Immediately upon being triggered multivibrator 65 applies a disabling pulse to AND gate 61. The output of multivibrator 63 is differentiated by the differentiator 64 and a positive trailing edge applied to AND gate 37 through input 51. Gate 37 is then enabled thereby permitting the signals on the R channels 25 to be passed through gate 32 to set the flip-flops 39. Because input 49 from the sweep generator 54 is necessary, an output pulse can appear on gate 37 indicating registration time only during the unblanked portion of the scan.

As has been stated, when a pulse appears on the output of gate 61 the multivibrator 65 applies a disabling pulse to gate 61. This disabling pulse continues to be applied for a time period equal to the time period that the multivibrator 65 remains in its unstable state. This time period is chosen to be long enough to allow the character just recognized to move a distance sufficient to take it out of horizontal registration. The reason for establishing this time period in this manner is that during a series of scans a number of pulses will appear on the outputs of gates 57 and 59. This will be understood if it is remembered that the character image is constantly traversing the sensors. Thus, after the registration is established, there are many times at which black video will appear simultaneously at two adjacent V sensors and at two adjacent H sensors. It then follows that a plurality of pulses, for any given character, appears at the input of gate 32. However, only one of these pulses can lead to recognition. That is the pulse which occurs during registration. This is because the signals pass from the R channels to the flip-flops 39 only at registration.

It is important, however, once a character has been registered to allow sufficient time for that character to move out of registration before the next output pulse appears on gate 37. This is necessary in order to prevent the same character from being recognized twice. This situation would occur if, after having passed the signals from the R channels through gate 32 for a given character, and after having set the flip-flops 39 to depict that character, the flip-flops 39 were reset and another set of signals from the same character were permitted to pass through gate 32 while the character was still in registration. Multivibrator 65 prevents this from happening by maintaining a disabling pulse on the input of gate 61 until a character, after having been registered, has passed out of registration. As has been stated, if the duration of the multivibrator 65 is less than the time corresponding to the width of a character, a plurality of pulses may appear at the output of gate 37 for a single character. However, only one of these pulses can lead to recognition since only one of them occurs at registration time. This pulse is the first pulse to appear at the output of gate 37 for a given character.

The output signal which appears on the output of gate 61 does not immediately appear on input 51 of gate 37, but is subject to delay in multivibrator 63. The delay in multivibrator 63 is adjusted to be of the order of one-half the time required to scan vertically from one row of sensors to the next. This permits the V sensors to be used for recognition, as well as for registration. This delay is necessary in order that the V sensors be used for both purposes since, while the character is scanning, in a vertical direction, a pulse may appear at the output of gate 53 before the edge of the character has passed completely over the V sensors. That is, two V sensors may be partially covered by a portion of a character and this may be sufficient to trigger the equipment establishing registration. If the V sensors are used for recognition, as well as for registration, it is desirable to have the character completely in position before registration is established. As has been stated, the character may only cover part of two V sensors and still effect triggering of the recognition equipment. By delaying the registration pulse in the order of one-half the time required to scan vertically from one row of sensors to the next, the character is permitted to travel this distance insuring it is completely in registration when recognition occurs.

We will now proceed with a description of the method and apparatus for resetting the flip-flop 39. As shown in FIGURE 4, the output of AND gate 37, besides being directed to input 38 of gate 32, is also directed to the multivibrators 67, and from there, to the blocking oscillator 69. The output of blocking oscillator 69 is applied to the reset side of flip-flops 39. Thus, when registration occurs, the output of gate 37 enables gate 31 and allows the recognition signals to pass therethrough. This output also triggers multivibrator 67. The pulse received from gate 37 is delayed in multivibrator 67, and after the appropriate time has elapsed, this pulse brings about the resetting of the flip-flops 39. The delay between the time that registration is established to pass signals to AND gate 32 and the time at which the flip-flops 39 are reset is not critical. The minimum delay required is the time for the flip-flops 39 and the master recognition matrix 41 to switch. The upper limit, or maximum delay should be about one-quarter of the time required to scan vertically from one row of sensors to the next. With fast circuits considerable range exists between these extremes. Then, so long as the vertical scanning rate is such that one-quarter of the time required to scan vertically from one row of sensors to the next is greater than the overall rise time of the recognition portion of the system, the flip-flops 39 may be reset at the proper time without placing stringent requirements on the components of the system.

Figure 6:
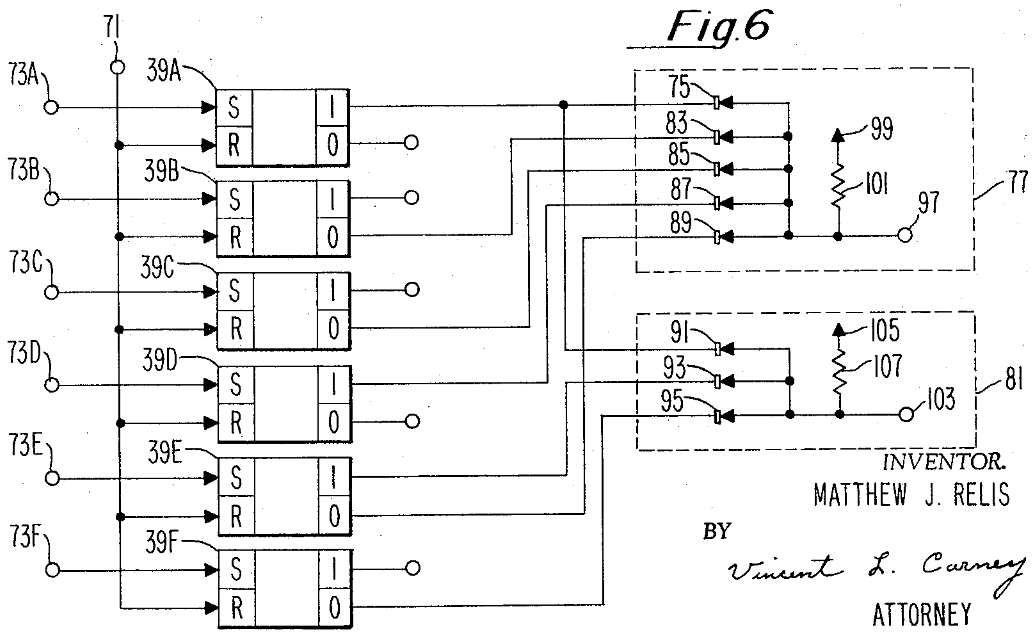
FIGURE 6 is a simplified schematic diagram of a circuit suitable for the master recognition matrix.

In FIGURE 6, a simplified schematic circuit diagram of a master recognition matrix is shown illustrating the manner in which the master recognition matrix 41 of FIGURE 4 operates. In FIGURE 6, six flip-flops 39A–39F are shown. These flip-flops correspond to the flip-flop 39 shown in FIGURE 4. Actually one flip-flop is necessary for each of the "R" channels so as to register a bit of information from any one of the "R" photocells. A terminal 71 is electrically connected to the reset input of each of the six flip-flops 39A–39F and is electrically connected to the output of the blocking oscillator 69 shown in FIGURE 4. Six set terminals 73A–73F are each electrically connected to the set input of a corresponding one of the six flip-flops 39A–39F.

Each of the six flip-flops 39A–39F has two outputs: a binary "one" output and a binary "zero" output. These outputs provide a positive output voltage pulse when the flip-flop is set or reset respectively. The binary "one" output of flip-flop 39A is electrically connected to the cathode of the diode 75 in AND gate 77 and to the cathode of the diode 91 in the AND gate 81; the binary "zero" output of the flip-flop 39B is electrically connected to the cathode of the diode 83 in the AND gate 77; the binary "zero" output of the flip-flop 39C is electrically connected to the cathode of the diode 85 in the AND gate 77; the binary "one" output of the flip-flop 39D is electrically connected to the cathode of the diode 87 in the AND gate 77; the binary "zero" output of the flip-flop 39E is electrically connected to the cathode of the diode 89; a binary "one" output terminal of the flip-flop 39E is electrically connected to the cathode of the diode 93 in the AND gate 81; and the binary "zero" output of the flip-flop 39F is electrically connected to the cathode of the diode 95 in the AND gate 81.

The anodes of the diodes 75, 83, 85, 87, and 89 are each electrically connected to the output terminal 97 and to a source of voltage 99 through a resistor 101 to complete the AND gate 77; the anodes of the diodes 91, 93, and 95 are each electrically connected to the output terminal 103 and to a source of positive voltage 105 through a resistor 107 to complete the AND gate 81.

The AND gates 77 and 81 each correspond to a different character which is to be recognized, being selectively electrically connected through diodes to outputs of flip-flops 39A–39F. The AND gate 77 provides a positive output voltage at terminal 97 if the character which this AND gate is intended to recognize is under the R photocells in FIGURE 4 at registration time, and a positive voltage is provided to terminal 103 by the AND gate 81 if the character which is intended to be recognized by this AND gate is under the R photocells at registration time. In AND gate 77 the positive voltage from the source 99 is primarily dropped across the resistor 101 unless each of the diodes 75, 83, 85, 87, and 89 are blocked. Similarly, a positive output pulse appears at terminal 103 only when the three diodes 91, 93, and 95 of the AND gate 81 are blocked.

The five diodes 75, 83, 85, 87 and 89 are each blocked so as to provide an output voltage at terminal 97 whenever the flip-flops 39A and 39D are set at the binary "one" state and the flip-flops 39B, 39C and 39E are reset to the binary "zero" position. The three diodes 91, 93 and 95 of the AND gate 81 are each blocked so as to provide an output pulse at terminal 103 whenever the flip-flops 39A and 39E are set so as to provide a binary "one" output and the flip-flop 39F is reset so as to provide a binary "zero" output.

The flip-flops 39A–39F are all reset prior to recognition time by a voltage pulse on terminal 71 from the blocking oscillator 69 shown in FIGURE 4. If, at registration time, the photocells are over a character, a black video signal causes a voltage pulse to be applied to the corresponding terminals 73A–73F so as to set the corresponding flip-flops. Therefore, each of the flip-flops 39A–39F is in the set or reset condition depending upon whether its corresponding photocell is over a character to be recognized or not. Those of the flip-flops 39A–39F which are expected to have their corresponding phototube over a character which is to be indicated by the AND gate 77 have their binary "one" output terminal electrically connected to the cathode of a diode in this AND gate as is the case with flip-flops 39A and 39D. Those of the flip-flops 39A–39F which are expected to have their corresponding phototubes over an area where there is no character at registration time when the character which is to be indicated by the AND gate 77 is under the phototube array, have their binary "zero" output electrically connected to the cathode of a diode in this gate as is the case with the flip-flops 39B, 39C and 39E. Those flip-flops which are expected to have their corresponding phototubes on the border line area are not electrically connected to the AND gate 77 at all.

To recapitulate, there is one flip-flop 39 for each sensor point in the matrix of sensors. At registration, the flip-flops 39 assume the pattern of conditions unique for the character in registration. Each flip-flop 39 has attached to its outputs a number of diodes not to exceed the number of characters to be recognized. The number of diodes attached to each flip-flop may be less than the number of characters to be recognized or less than the total number of AND gates contained in the master recognition matrix 41 due to the fact that for any of the characters to be recognized, it may be uncertain whether a particular flip-flop is to receive a black or a white video signal.

When a particular character comes into registration, the AND gate adapted to recognize that character by virtue of electrical connection through diodes to the "one" or "zero" outputs of selected ones of flip-flops 39A–39F has all of its diodes reverse biased. This condition obtains only in one AND gate. When all of the diodes are reverse biased, the AND gate generates an output signal. This output signal indicates which of the characters have come into registration so as to provide a recognition signal.

It can be seen that a character recognition device according to this invention is reliable and accurate even when there are wide variations in document velocity and vertical scanning rate during scanning. This accuracy is achieved without undue complexity or expense. It is capable of recognizing characters on a document even when the document is not in absolute darkness.

Obviously, many modifications and variations are possible in the light of the above teachings. It is therefore to be understood that, within the scope of the appended claims, the invention may be practiced otherwise than as specifically described.

What is claimed is:

1. Apparatus for recognizing indicia recorded upon a medium, comprising:
- a plurality of sensing means arranged in at least one column which is coextensive with the indicia in at least one dimension for providing electric signals representative of said indicia;
- registration responsive means for scanning and detecting registration of said indicia with respect to said sensing means; and
- identification means for identifying said indicia from said electric signals;
- said registration responsive means including transmission gating means, electrically connected between said sensing means and said identification means, for controllably transmitting said signals from said sensing means to said identification means and control gating means electrically connected to selected ones of said sensing means for providing a control signal to said transmission gating means upon receiving electric signals from adjacent ones of selected ones of said sensing means.

2. Apparatus for recognizing indicia recorded upon a medium according to claim 1 in which said sensing means comprises:
- an array of transducers for converting said indicia to electrical signals;
- said transducers each being positioned in a different spatial location with respect to said medium.

3. Apparatus for recognizing indicia recorded upon a medium according to claim 1 in which said control gating means comprises:
- pulse generating means for generating a voltage pulse when a section of said indicia having a predetermined minimum dimension is in juxtaposition with adjacent ones of selected ones of said sensing means; and
- said transmission gating means is electrically connected to said sensing means, to said identification means and to said pulse generating means, for conducting said electric signals from said sensing means to said identification means upon receiving a voltage pulse from said pulse generating means.

4. Apparatus for recognizing indicia recorded upon a medium according to claim 3 in which said registration responsive means comprises:
- image-converter tube means for providing electrical signals representing said indicia in the form of electrical charges at one location, for transmitting said electrical charges to a second location and for converting said electrical charges to a replica of said indicia at said second location;
- said image-converter tube means including deflection means for periodically translating said electric charges in a vertical direction, whereby a replica of a vertical segment of said indicia is transmitted to said second location; and
- medium transport means for moving said medium in a horizontal direction, whereby a replica of horizontally adjacent segments of said indicia is transmitted to said second location.

5. In a character recognition device of the type having a reading device for converting indicia moving past said reading device to electrical signals so that said indicia may be identified from said electrical signals, apparatus for determining when said indicia are positioned with respect to said reading device for identification comprising:
- first transducer means for generating an electric signal when said indicia is in juxtaposition with said first transducing means;
- second transducer means for generating an electrical signal when said indicia is in juxtaposition with said second transducer means;
- said first and second transducer means being a predetermined distance apart, each for generating an electric pulse when said indicia has a predetermined minimum length in a direction which is in line with said first and said second transducer means;
- a registration responsive coincidence gate for generating an output voltage when receiving a voltage from both said first transducer means and said second transducer means, resulting from detection of said predetermined minimum indicia length indicative of registration of an indicium with the reading device;

a second coincidence gate selectively electrically connected to said reading device for generating an output voltage upon detection of a second predetermined minimum indicia length; and control means having an output terminal, an input terminal electrically connected to the reading device and a control terminal electrically connected to the coincidence gate for receiving the output voltage from said coincidence gate and for presenting the electrical signals from the reading device at the control means output terminal upon receiving said output voltages from the coincidence gates.

6. In a character recognition device of the type in which a character-recognition sensing means moves relative to a medium having indicia recorded thereon and generates electrical signals which are capable of identifying said indicia, apparatus for controlling the time at which said signals generated by said character-recognition sensing means are conducted to a device for identifying said indicia comprising:

horizontal-registration means, including first and second transducers, for generating an output voltage when a portion of said indicia is in juxtaposition with both said first and second transducers;

vertical-registration means, including a third and fourth transducer, for generating an output voltage when a portion of said indicia is in juxtaposition with both said third and fourth transducers;

said first and second transducers being in a line which is orthogonal to a line along which said third and fourth transducers are located;

said first and second transducers being adjacent to one side of said character-recognition sensing means and said third and fourth transducers being on an adjacent side of said character-recognition sensing means; and coincidence means for passing said electrical signals indicating said indicia to said device for identifying said indicia only upon receiving a voltage pulse from both said vertical-registration means and said horizontal-registration means.

7. Apparatus for recognizing indicia recorded upon a medium, comprising:

a plurality of sensing means, including a plurality of transducers, for producing signals from those transducers which are impinged upon by a portion of an image of said indicia;

scanning means for projecting the image of different portions of said indicia upon different ones of said sensing means and for deflecting said image in a vertical and horizontal direction relative to said sensing means;

identifying means responsive to said signals from said sensing means for identifying said image;

first gating means for transmitting said signals generated by said sensing means to said identifying means; and second gating means for inhibiting transmission of said signals generated by said sensing means to said identifying means until selected ones of said transducers generate a signal indicating that a portion of said image is impinging upon them.

8. Apparatus for identifying indicia recorded upon a medium, comprising:

sensing means, including a plurality of transducers, for generating a signal in the form of a plurality of voltages originating with those transducers of said plurality of transducers upon which an image of said indicia is impinging;

scanning means for producing an image of said indicia, for projecting said image upon said sensing means, and for deflecting said image in a vertical and horizontal direction relative to said sensing means;

identifying means for identifying said indicia from said signals generated by said sensing means;

first gating means for transmitting signals from a first selected plurality of said transducers to said identifying means;

second gating means for inhibiting transmission of said signals by said first gating means to said identifying means until a signal is generated on a second plurality of said transducer means; and third gating means for inhibiting the transmission of said signals generated by said sensing means from said first gating means to said identifying means until voltages are generated by a third selected plurality of said transducers.

9. A character recognition device comprising:

a document transport means for moving a document containing characters in a predetermined direction;

an image-converter tube having its lens and photocathode positioned adjacent to the face of said document transport means;

deflection coils positioned on said image-converter tube for deflecting images formed on the phosphor screen of the image-converter tube in a directional orthogonal to the direction of motion of the document transport means;

a plurality of recognition light conductors placed in the form of a matrix on the phosphor screen of said image-converter tube;

a first pair of registration light conductors having their ends placed on one side of the matrix of recognition light conductors in a line parallel to the same side of said matrix;

a second pair of registration light conductors placed on an adjacent side of said matrix of recognition light conductors and in a line parallel to said adjacent side;

a plurality of recognition photocells;

each of said recognition photocells being in juxtaposition with one of said recognition light conductors so as to generate electrical signals representing said image on said phosphor screen;

a first pair of registration photocells each electrically connected to the ends of different ones of said first pair of registration light conductors;

a second pair of registration photocells each electrically connected to a different one of said second pair of registration light conductors;

a plurality of recognition AND gates;

each of said recognition AND gates having one of its two input terminals electrically connected to a different one of said recognition photocells;

a first registration AND gate having two inputs each electrically connected to a different one of said first pair of registration photocells;

a second registration AND gate having two inputs each of which is electrically connected to a different one of said second pair of registration photocells;

pulse generating means for generating a pulse when said image-converter tube is deflecting said image in said direction orthogonal to the direction of document movement in said document transport means;

first control AND gating means, having three coincidence input terminals and one inhibit input terminal, for generating an output voltage pulse upon receiving voltage pulses on said three coincidence input terminals and not receiving a voltage pulse upon said inhibit input terminal;

a different one of said three coincidence input terminals being electrically connected to said first registration AND gate, said second registration AND gate, and said pulse generating means;

the output of said first control AND gate being electrically connected to a first delay line and to a second delay line;

the output of said second delay line being electrically connected to said inhibit terminal;

a second control AND gate having two input terminals;

the output of said pulse generating means being electrically connected to one of the two inputs of said second control AND gate and the output of said first delay line being electrically connected to the second of said two input terminals of said second control AND gate;

the second input terminal of each of said recognition AND gates being electrically connected to the output of said second control AND gate;

a third delay line having its input electrically connected to said second control AND gate;

a plurality of non-complementing flip-flops each having a set input terminal and a reset input terminal, a binary "one" output terminal for providing an output voltage when said flip-flop is set and a binary "zero" output terminal for providing an output voltage when said flip-flop is reset;

a set terminal of each of said recognition flip-flops being electrically connected to the output of a different one of said recognition AND gates;

the reset terminal of each of said recognition flip-flops being electrically connected to the output of said third delay line; and a plurality of character indication AND gates each having an output terminal for providing a voltage indicating a character and each having a plurality of input terminals;

each of the input terminals of each of said recognition AND gates being electrically connected to the binary "one" and binary "zero" output terminals of said recognition flip-flops which contain an output voltage when a character represented by a particular recognition AND gate is projected upon the phosphor screen of said image-converter tube with a portion of it being under each of said first pair of registration photocells and second pair of registration photocells.

References Cited by the Examiner

UNITED STATES PATENTS

| | | | |
|---|---|---|---|
| 3,025,495 | 3/1962 | Endres | 340—146.3 |
| 3,058,093 | 10/1962 | Vernon et al. | 340—146.3 |
| 3,112,468 | 11/1963 | Kamentsky | 340—146.3 |
| 3,142,761 | 7/1964 | Rabinow | 340—146.3 |
| 3,165,717 | 1/1965 | Eckelman et al. | 340—146.3 |
| 3,170,138 | 2/1965 | Buckingham et al. | 340—146.3 |
| 3,173,126 | 3/1965 | Rabinow | 340—146.3 |
| 3,179,922 | 4/1965 | Rabinow | 340—146.3 |
| 3,179,923 | 4/1965 | Rabinow | 340—146.3 |
| 3,197,735 | 7/1965 | Haynes et al. | 340—146.3 |

FOREIGN PATENTS

| | | |
|---|---|---|
| 910,808 | 11/1962 | Great Britain. |

MAYNARD R. WILBUR, *Primary Examiner.*

MALCOLM A. MORRISON, *Examiner.*

J. E. SMITH, *Assistant Examiner.*